United States Patent
Still (10) Patent No.: US 9,018,792 B2
(45) Date of Patent: Apr. 28, 2015

(54) ARRANGEMENT FOR OPERATING CONSUMERS IN A RAIL VEHICLE WITH ELECTRICAL ENERGY, SELECTIVELY FROM AN ENERGY SUPPLY NETWORK OR FROM A MOTOR-GENERATOR COMBINATION

(75) Inventor: Ludwig Still, Einhausen (DE)

(73) Assignee: Bombardier Transportation GmbH, Berlin (DE)

( * ) Notice: Subject to any disclaimer, the term of this patent is extended or adjusted under 35 U.S.C. 154(b) by 929 days.

(21) Appl. No.: 13/147,909

(22) PCT Filed: Feb. 11, 2010

(86) PCT No.: PCT/EP2010/000963
§ 371 (c)(1),
(2), (4) Date: Sep. 14, 2011

(87) PCT Pub. No.: WO2010/091899
PCT Pub. Date: Aug. 19, 2010

(65) Prior Publication Data
US 2011/0316333 A1    Dec. 29, 2011

(30) Foreign Application Priority Data
Feb. 12, 2009 (DE) .................. 10 2009 008 549

(51) Int. Cl.
*B60L 1/00* (2006.01)
*B60L 11/12* (2006.01)
*B60L 9/30* (2006.01)

(52) U.S. Cl.
CPC .............. *B60L 11/123* (2013.01); *B60L 1/003* (2013.01); *B60L 9/30* (2013.01); *Y02T 10/6217* (2013.01); *Y02T 10/70* (2013.01); *Y02T 10/7077* (2013.01); *B60L 2200/26* (2013.01)

(58) Field of Classification Search
CPC ....... B60L 9/30; B60L 2200/26; Y02T 10/725
USPC ............. 307/9.1; 363/71; 180/65.1; 318/362; 191/3
See application file for complete search history.

(56) References Cited

U.S. PATENT DOCUMENTS
4,095,154 A * 6/1978 Williamson ................... 318/376
4,730,245 A * 3/1988 Sato ................................. 363/54
(Continued)

FOREIGN PATENT DOCUMENTS
DE    220271 A1    3/1985
DE    3817652 A1   12/1989
(Continued)

OTHER PUBLICATIONS
Dvoracek et al., "Elektrische Doppellokomotiven Fur Die Nordskandinavische Erzbahn// Electric Twin-Locomitives for North-Scandinavian Iron-Ore Railway Line//Locomotives Electriques Couplees En Double Pour La Ligne Miniere En Nord-Scandinavie", Elektrische Bahnen, Aug. 1, 2001, pp. 311-324, Oldenbourg Industrieverlag, Munchen, DE-XP001087022, ISSN 0013-5437.
(Continued)

*Primary Examiner* — Carlos Amaya
*Assistant Examiner* — Alfonso Perez Borroto
(74) *Attorney, Agent, or Firm* — The Webb Law Firm (57) ABSTRACT

An arrangement for operating a rail vehicle includes a DC voltage intermediate circuit which is connected to an energy supply network, at least one traction inverter which is connected at its DC voltage side to the DC voltage intermediate circuit and at its AC voltage side which is connected one or more traction motors of the rail vehicle. An auxiliary system inverter is connected at its DC voltage side to the DC voltage intermediate circuit and is connected at its AC voltage side to a primary side of an auxiliary system transformer. Auxiliary systems are connected to a secondary side of the auxiliary system transformer via an auxiliary line. Electrical energy generated by an electrical energy supply unit is transferred via the auxiliary line, the auxiliary system transformer and the auxiliary system inverter into the DC voltage intermediate circuit for operation of the at least one traction motor.

14 Claims, 4 Drawing Sheets

(56) References Cited

U.S. PATENT DOCUMENTS

| | | | | |
|---|---|---|---|---|
| 4,900,944 | A * | 2/1990 | Donnelly | 290/3 |
| 5,170,105 | A * | 12/1992 | Kumar | 318/362 |
| 5,582,262 | A | 12/1996 | Wust | |
| 5,614,796 | A * | 3/1997 | Minderlein et al. | 318/376 |
| 5,670,851 | A * | 9/1997 | Numazaki | 318/106 |
| 5,735,215 | A | 4/1998 | Tegeler | |
| 5,847,534 | A * | 12/1998 | Tanamachi et al. | 318/801 |
| 6,023,137 | A * | 2/2000 | Kumar et al. | 318/400.27 |
| 6,278,256 | B1 * | 8/2001 | Aoyama | 318/801 |
| 6,294,886 | B1 * | 9/2001 | Gibard | 318/161 |
| 6,397,759 | B1 * | 6/2002 | Hubert et al. | 105/26.05 |
| 6,538,412 | B1 * | 3/2003 | Klose et al. | 318/801 |
| 6,686,712 | B2 * | 2/2004 | Numaguchi et al. | 318/34 |
| 6,755,267 | B2 * | 6/2004 | Yamada et al. | 180/65.8 |
| 7,102,901 | B2 * | 9/2006 | Falk et al. | 363/65 |
| 7,304,445 | B2 * | 12/2007 | Donnelly | 318/108 |
| 7,416,039 | B1 * | 8/2008 | Anderson et al. | 180/165 |
| 7,451,842 | B2 * | 11/2008 | Hemmi et al. | 180/65.1 |
| 8,013,469 | B2 * | 9/2011 | Masselus | 307/31 |
| 8,421,266 | B2 * | 4/2013 | Kumar | 307/9.1 |
| 8,453,814 | B2 * | 6/2013 | Gambach et al. | 191/3 |
| 8,456,128 | B2 * | 6/2013 | Fotherby | 318/800 |
| 8,907,255 | B2 * | 12/2014 | Bellegarde | 219/486 |
| 2001/0012207 | A1 * | 8/2001 | Nomura | 363/17 |
| 2002/0101747 | A1 * | 8/2002 | Falk et al. | 363/71 |
| 2003/0160595 | A1 * | 8/2003 | Provanzana et al. | 320/166 |
| 2004/0227036 | A1 * | 11/2004 | Arita et al. | 246/209 |
| 2006/0145542 | A1 * | 7/2006 | Kusubayashi | 307/145 |
| 2007/0126377 | A1 * | 6/2007 | Chanal | 318/109 |
| 2007/0138982 | A1 * | 6/2007 | Guggisberg et al. | 318/140 |
| 2008/0122393 | A1 * | 5/2008 | Negoro et al. | 318/552 |
| 2008/0158921 | A1 * | 7/2008 | Stefanutti et al. | 363/67 |
| 2008/0198637 | A1 * | 8/2008 | Meysenc et al. | 363/67 |
| 2008/0252182 | A1 * | 10/2008 | Daigle et al. | 310/75 R |
| 2008/0288192 | A1 * | 11/2008 | Kumar et al. | 702/60 |
| 2009/0066272 | A1 * | 3/2009 | Jobard et al. | 318/375 |
| 2009/0224705 | A1 * | 9/2009 | Jobard et al. | 318/380 |
| 2009/0224706 | A1 * | 9/2009 | Jobard | 318/380 |
| 2009/0271056 | A1 * | 10/2009 | Kitanaka | 701/22 |
| 2009/0284199 | A1 * | 11/2009 | Kitanaka | 318/400.24 |
| 2010/0079093 | A1 * | 4/2010 | Kitanaka | 318/400.3 |
| 2011/0166736 | A1 * | 7/2011 | Kitanaka | 701/22 |
| 2011/0253113 | A1 * | 10/2011 | Roth et al. | 123/568.12 |
| 2013/0113279 | A1 * | 5/2013 | Hatanaka | 307/9.1 |
| 2013/0147266 | A1 * | 6/2013 | Bangtsson et al. | 307/9.1 |
| 2013/0229052 | A1 * | 9/2013 | Kitanaka | 307/9.1 |
| 2014/0139016 | A1 * | 5/2014 | Lovercheck et al. | 307/9.1 |

FOREIGN PATENT DOCUMENTS

| | | | |
|---|---|---|---|
| DE | 4335849 C1 | 6/1995 | |
| DE | 102009008549 A1 * | 8/2010 | B60L 11/12 |
| WO | 9610508 A1 | 4/1996 | |
| WO | 2006138130 A2 | 12/2006 | |
| WO | WO 2010091899 A1 * | 8/2010 | |

OTHER PUBLICATIONS

Feilcke, "Die Elektrische Ausrustung Der Zweikraftlokomotive DM30AC Fur Die Long Island Rail Road", Zeitschrift Fur Eisenbahnwesen Und Verkehrstechnik. Die Eisenbahntechnik + Glasers Annalen, Apr. 1, 1998, pp. 139-143, Georg Siemens Verlagsbuchhandlung. Berlin, DE XP000750677, ISSN 0941-0589.

* cited by examiner

ARRANGEMENT FOR OPERATING CONSUMERS IN A RAIL VEHICLE WITH ELECTRICAL ENERGY, SELECTIVELY FROM AN ENERGY SUPPLY NETWORK OR FROM A MOTOR-GENERATOR COMBINATION

BACKGROUND OF THE INVENTION

1. Field of the Invention

The invention relates to an arrangement for operating consumers in a rail vehicle with electrical energy, wherein the arrangement is capable of being supplied or is supplied selectively from an energy supply network or from a motor-generator combination. The invention further relates to a rail vehicle with such an arrangement and a method for operating said arrangement and said rail vehicle.

The invention also relates in particular to a circuit arrangement with a code for controlling the operation of the circuit arrangement so that rail vehicles that are primarily supplied with electrical energy via the electrical energy supply network can also be operated without the network in certain operating situations. Examples of such special operating situations include shunting operation without network contact, operation during outages or operation on shorter stretches where there is no contact between the rail vehicle and the network (e.g., power rail outage or no overhead line).

2. Description of Related Art

Hybrid drive systems for supplying a DC voltage intermediate circuit with electrical energy and if necessary, alternatively with approximately equal diesel electric power, are known to the prior art. The consumers of the rail vehicle (particularly auxiliary systems and at least one traction motor) are supplied with energy from this intermediate circuit via an inverter.

Figure 1:
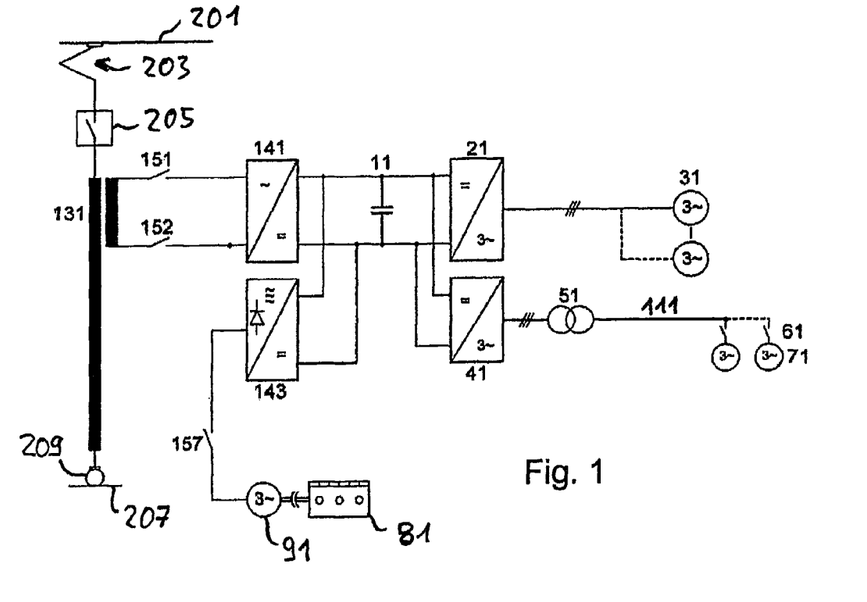
FIG. 1 is a schematic illustration of an electrical energy supply system of a rail vehicle that is electrically connected to a power supply network via an overhead power wire and comprises a motor-generator combination, which when needed can generate electric power approximately equal to the output of the power network.
Figure 2:
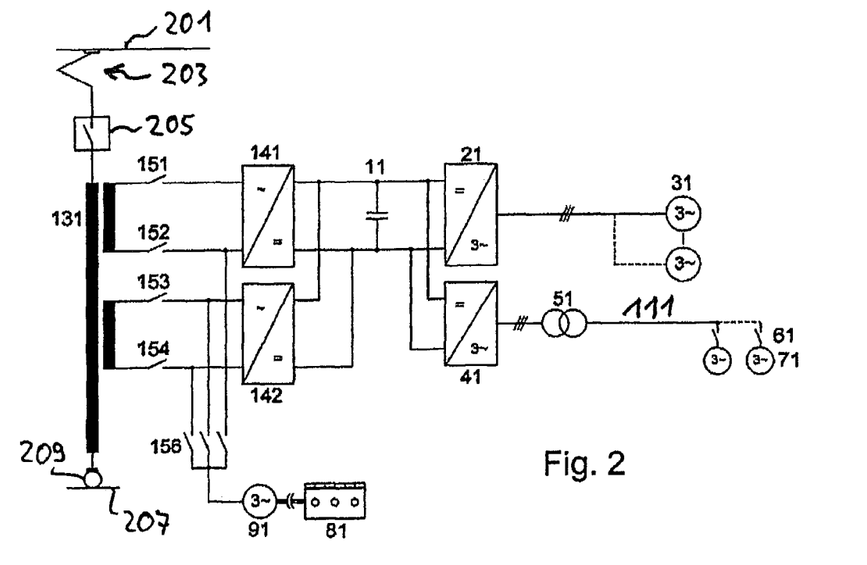
FIG. 2 shows an arrangement similar to the one in FIG. 1 in which, however, provision is made of two coils on the secondary side of the main transformer, which are capable of supplying a DC voltage intermediate circuit with electrical energy via a rectifier in each case, and in which the generator of the motor-generator combination is connected to three phases of the secondary coils of the main transformer via a switching mechanism.

In these hybrid circuits for selectively supplying power from either the contact line network or a diesel generator unit, the diesel engine-powered generator (as shown in FIG. 1 and FIG. 2) is connected to the rail vehicle electrical energy supply system via a three-phase AC line.

The contact wire laid along the route is designated with the reference number 201 in FIG. 1. The rail vehicle contacts the contact wire 201 via a current collector 203, which is connected via a main switch 205 to the primary side of a main transformer 131 and via its secondary side and via switches 151, 152 to the AC voltage side of a rectifier 141. A DC voltage intermediate circuit 11 is connected to the DC voltage side of the rectifier 141. For supplying at least one traction motor 31, the arrangement has at least one traction inverter 21, the DC voltage side of which is connected to the DC voltage intermediate circuit 11. The at least one drive motor 31 is connected to the AC voltage side of the traction inverter 21. Furthermore, auxiliary systems 71 that do not serve directly to provide traction of the rail vehicle are connected via an auxiliary system line 111 and via switches 61 to the AC voltage side of an auxiliary system inverter 41. A transformer 51 is connected between the AC voltage side and the auxiliary system line 111 in order to transform the high AC voltage residing on the AC voltage side down to the lower voltage level of the auxiliary systems 71. The DC voltage side of the auxiliary system inverter 41 is likewise connected to the DC voltage intermediate circuit 11. The primary side of the transformer 131 is normally in electric contact with the track 207 via one or several wheels 209 of the rail vehicle.

In order to enable the operation of the rail vehicle even when no electrical energy can be drawn from the energy supply network via the contact wire 201, the rail vehicle is in addition equipped with a motor 81, generally a diesel engine. When it is in operation, this motor 81 powers a generator 91, which is connected to a rectifier 143 via a three-phase line connection, which can be disconnected with a switch 157. This rectifier 143 can in particular be a so-called B6-bridge. The DC voltage side of the rectifier 143 is likewise connected to the DC voltage intermediate circuit 11.

A variant will be described with reference to FIG. 2. Parts and elements that are the same or that have the same functions are designated with the same reference numbers and will not be described again.

The main transformer 131 at the network side of the DC voltage intermediate circuit 11 is equipped with two parallel secondary coils. Like the first coil, the second coil is connected via switches 153, 154 and via a second rectifier 142 to the DC voltage intermediate circuit 11. The generator 91 is separably connected via a three-phase switch mechanism 156 to both of the AC voltage phases of the second secondary coil and to an AC phase of the first secondary coil of the main transformer 131. The electrical energy generated by the generator 91 is therefore not fed into the DC voltage intermediate circuit 11 via a rectifier especially provided for the motor-generator system as in FIG. 1, but via the rectifiers 141, 142 in use even during the network operation of the rail vehicle.

In both cases, however, the generator 91 must generate a high voltage, or be engineered for the pulsed and correspondingly high intermediate circuit voltage arising on the generator terminals when the rectifiers 141 and/or 142 are operating as boost converters. Accordingly, the motor powering the generator is likewise engineered for high mechanical performance. As a general rule the motor-generator combination is capable of feeding, via the appropriate rectifiers, nearly the same electric power into the DC voltage intermediate circuit that is fed into said DC voltage intermediate circuit via contact wire, power rail, or the like on the network side during network operation. The cost for the additional possibility of supplying the rail vehicle with electrical energy from the motor-generator combination is therefore relatively high.

If no multisystem capability is required, i.e., the rail vehicle, in particular the locomotive or the engine, is not engineered for continuous operation on the energy supply network as well as selectively with the motor-generator combination, this cost then seems unnecessary. If operation with a motor-generator combination only needs to be possible for the aforementioned exceptional operation in special situations (such as shunting trips, brief power outages, or the like), the cost for a generator engineered for direct power feed into an intermediate circuit via rectifiers and also for the accessory switch and rectifier units seems too high.

SUMMARY OF THE INVENTION

An object of the present invention is to propose an arrangement of the aforementioned type as well as a suitable method for supplying rail vehicles with electrical energy that make do with a motor or other network-independent unit with lower drive capacity and in which the cost for electric mechanisms for network-independent operation is also reduced.

The invention is based upon the assumption that additional electrical components such as the rectifier 143 of FIG. 1 and the switch mechanisms 156, 157 (see FIG. 2 or FIG. 1) are required for the motor-generator system described with reference to FIG. 1 and FIG. 2. If the rail vehicle were a vehicle operated on a DC voltage network, there would be no rectifier on the input side of the DC voltage intermediate circuit and such a rectifier would have to be provided additionally.

The invention is also based on the fact that the intermediate circuit voltage may not drop below a certain minimum value in order to ensure the supply of the auxiliary systems and operation security of the converter. This minimum voltage is frequently five to seven tenths of the nominal voltage of the DC voltage intermediate circuit. Standard complete energy supply units (with a motor and a generator powered by said motor) operate with a nominal voltage of 400 V (three-phase current) and a frequency of 50 Hz or 480 V and 60 Hz. When such energy supply units are to be connected to the DC voltage intermediate circuit, as a general rule they must be stepped up to the minimum voltage of between 1200 V and 1800 V required for operating the traction inverters and auxiliary systems. This is possible with, for instance, a pulsed converter or by interconnecting a transformer on the three-phase current side of the rectifier. Alternatively, the generator could be configured in terms of its nominal voltage and speed for higher values than the aforementioned ones. However, this requires a special energy supply unit that is no longer commercially available.

Hooking up the generator of the motor-generator combination to the auxiliary system line is therefore proposed. If provision is made of a transformer for the down transformation of the output voltage of the auxiliary system inverter between the auxiliary system inverter and the auxiliary systems (as is usually the case), the generator of the motor-generator combination is preferably hooked up to the auxiliary system line on the low voltage side of the transformer.

The electric power fed into the auxiliary system line by the motor-generator combination suffices at least for the short term operation of the drive motors, or for longer term operation of the drive motors (i.e., the traction motors of the rail vehicle) with low traction power. This electric power is stepped up to a higher voltage level by the transformer, fed to the AC voltage side of the auxiliary system inverter, rectified by the auxiliary system inverter, and fed into the DC voltage intermediate circuit. The minimum voltage required in the DC voltage intermediate circuit can be ensured by the passive rectifier function of the auxiliary system inverter and appropriate selection of the transformation ratio of the transformer, or by suitable control of the auxiliary system inverter functioning as an active rectifier. From the DC voltage intermediate circuit, the traction inverter or inverters draw the electric driving power required for short-term operation or emergency operation.

In principle it is also possible to dispense with the transformer, for example, if the intermediate circuit voltage is sufficiently low. As a general rule, however, the auxiliary systems must be galvanically decoupled from the intermediate circuit, which is easily achievable with a transformer.

The previously described case with a DC voltage intermediate circuit, an auxiliary system inverter, and a transformer hooked up to the AC voltage side thereof is merely a simple illustrative embodiment. Other configurations of the electrical energy supply system for a rail vehicle are common in practice. For example, the auxiliary system inverter can feed several auxiliary system lines and/or provision can be made of several DC voltage intermediate circuits. Concrete examples of embodiment will be addressed in greater detail, with reference to the appended figures.

A cost-effective connection of the unit is achieved by electrically connecting the network-independent unit (particularly the generator of the motor-generator combination) to the auxiliary system line. In particular, no additional rectifiers are required, and the electric power of the generator can be fed in at low voltage. For this reason it is possible to employ motors and generators in particular that are engineered for an output lower than that for normal operation of the rail vehicle on the energy supply network. In particular, it is therefore possible to employ the aforementioned standard power supply units. Should the output of such a unit be insufficient, another unit or several other units can be electrically connected to the auxiliary system line or to another auxiliary system line of the rail vehicle.

The invention thus enables the cost-effective integration of a low output power generating unit in a rail vehicle that enables network-independent operation. The following applications in particular are possible: bridging over stretches without contact wires or power rails, light-duty shunting operation, emergency operation in the event of a network outage.

In particular, it is possible to configure the aforementioned power supply units for nominal voltages of 400 V with 50 Hz three-phase current or 480 V with 60 Hz three-phase current. Besides the motor (preferably a diesel engine) and the generator, the units can have additional components for independent operation that do not require connection to the energy supply network, particularly cooling mechanisms for the motor and/or generator (e.g., so-called heat exchangers and fans), a starter for the motor and/or a fuel tank for the motor fuel.

The following in particular is proposed: an arrangement for operating consumers in a rail vehicle with electrical energy, wherein the arrangement can be selectively supplied with electrical energy from an energy supply network or from a network-independent electrical energy supply unit, in particular a motor-generator combination, wherein said arrangement has the following:

- a DC voltage intermediate circuit that is connected to the energy supply network when the arrangement is being supplied with power from the energy supply network,
- at least one traction inverter that is connected to the DC voltage intermediate circuit at the DC voltage side and to the AC voltage side of which one or more traction motors of the rail vehicle are connected,
- an auxiliary system inverter, which is connected to the DC voltage intermediate circuit at the DC voltage side and to a primary side of an auxiliary system transformer on the AC voltage side, wherein auxiliary systems are connected to a secondary side of the auxiliary system transformer via an electrical auxiliary system line, wherein the auxiliary systems, in contrast to the at least one traction motor, do not serve directly to provide traction of the rail vehicle,
- (in the case of the motor-generator combination) a generator of the combination to which the motor, in particular an internal combustion engine, is capable of being connected or is connected,
- the electrical energy supply unit is electrically connected to the auxiliary system line so that for supplying the arrangement from the electrical energy supply unit, electrical energy generated by the unit is transferred into the DC voltage intermediate circuit via the auxiliary system line, the auxiliary system transformer, and the auxiliary system inverter and is available for the operation of the at least one traction motor.

Also proposed is: a method for operating consumers in a rail vehicle with electrical energy, wherein at least one traction motor of the rail vehicle is operated by inverting a DC voltage of a DC voltage intermediate circuit and wherein the DC voltage intermediate circuit is selectively supplied with electrical energy from an energy supply network or from a network-independent electrical energy supply unit, particularly a motor-generator combination, wherein:

auxiliary systems of the rail vehicle, which in contrast to the at least one traction motor do not serve directly to provide traction of the rail vehicle, are also supplied with electrical energy from the DC voltage intermediate circuit via an auxiliary system inverter, which is connected to the DC voltage intermediate circuit at the DC voltage side and which is connected to a primary side of an auxiliary system transformer at the AC voltage side, and via an auxiliary system line connected to a secondary side of the auxiliary system transformer, in supplying the DC voltage intermediate circuit with energy (e.g., the mechanical energy generated by operation of a motor, particularly of an internal combustion engine, that is converted into electrical energy by a generator) from the network-independent electrical energy supply unit, energy from the electrical energy supply unit is fed into the auxiliary system line, transformed by the auxiliary system transformer, and rectified by the auxiliary system inverter and fed into the DC voltage intermediate circuit in order to operate the at least one traction motor.

Feeding into the auxiliary system line gives rise to the following advantages:

Cost-effective, commercially available complete energy supply mechanisms with 480 V/60 Hz or 400 V/50 Hz generators can be employed because high voltage is not required.

No additional rectifier is needed.

A special pulsed operation of the rectifier on the input side of the DC voltage intermediate circuit to boost the voltage in said intermediate circuit (as in the case of FIG. 2) is not required in vehicles for operation on AC voltage networks.

The expense for switch mechanisms between the generator and the energy supply system of the rail vehicle is low, because the respective switch mechanism can be configured for relatively low voltages.

At least the portion of the electrical energy that serves directly to operate the auxiliary systems does not have to be conducted via the DC voltage intermediate circuit. The load on the auxiliary system inverter is thus relieved.

For several auxiliary system inverters with transformers, the performance capacity and operational security can be increased by suitable on and off switchable electrical connections.

The appropriate intermediate circuit voltage for the converter operation or required voltage of, e.g., five tenths to seven tenths of the nominal intermediate circuit voltage is achieved by using the auxiliary system transformer without any other active or passive mechanisms.

In wireless operation such as shunting operation, the rail vehicle frequently does not require traction over prolonged periods of time. Furthermore, usually only a portion of the auxiliary systems is required. The minimal auxiliary system performance required of locomotives for this special operation typically lies between 25 kW to 50 kW. Examples of the auxiliary systems required include air compressors for the pneumatic brake system, the battery charger for charging the main battery (i.e., electrical and/or electrochemical storage cell) of the rail vehicle and optionally the air conditioner for the engineer's cab.

A wireless operation by drawing electrical energy solely from a battery or battery system is currently impractical due to cost, weight, and maintenance reasons. Owing to the energy demand of the auxiliary systems, batteries are drained so much during the relatively long idle times that either no or else very little energy is available for traction. Hence 30 to 90 minute operation times with no network connection are only economically practical with a conventional internal combustion engine at the present time.

However, a combination of an internal combustion engine with an additional energy storage device (e.g., battery) is advantageous. The internal combustion unit covers the base load. During the long idle times no demand is placed on the energy storage device and the latter is charged as needed with the surplus energy of the generator not needed by the auxiliary systems. When there is a need for traction (i.e., a high output requirement), energy is drawn from the energy storage device and in addition transferred via the converter to the intermediate circuit and used to increase traction power. A concrete example of embodiment will be addressed in greater detail. The additional energy storage device can be connected to one of the two AC voltage connections of the rectifier on the network side via an inductor and a diode in each case. The same applies to a plurality of DC voltage intermediate circuits with one rectifier on the network side in each case. The additional energy storage device, however, can also be connected directly to the higher potential of the DC voltage intermediate circuit via a diode in each case.

Generally speaking, preference is given to provision of an additional electrically chargeable and electrically dischargeable energy storage device that is present in addition to the vehicle battery of the rail vehicle, wherein said additional energy storage device is connectable to the various potentials of the DC voltage intermediate circuit via a switch assembly. However, just using the vehicle battery to compensate for the fluctuating power requirement is also possible.

As a preferred embodiment of the method of the invention, it is therefore proposed that an additional energy storage device, which is present in addition to the vehicle battery and which is electrically chargeable and electrically dischargeable, be charged and, when the DC voltage intermediate circuit is being supplied with energy from the motor-generator combination, discharged by connecting said additional energy storage device to said DC voltage intermediate circuit in order to achieve a higher traction performance of the at least one traction motor. It is also possible, however, to use the vehicle battery in the same manner.

An additional energy storage device is also understood to mean a fuel cell or combination of fuel cells.

The additional energy storage device has electrical connections for charging and discharging. In a preferred embodiment of the arrangement, said additional energy storage device is connectable to a phase of a pulsed converter hooked up to the DC voltage intermediate circuit. Pulsed is understood to mean that phases of the converter are operated as DC converters, wherein switches (e.g. IGBTs or GTOs) are repeatedly switched on and off and with the help of an inductor, the desired voltage adjustment is thus achieved. During its normal operation, this converter component serves a specific purpose, particularly the rectification of an AC voltage of an energy supply network on the input side of the DC voltage intermediate circuit or as a traction inverter for inversion of the DC voltage of the DC voltage intermediate circuit for operating a traction motor. When this converter component is not needed for its normal operation, one of its phases can thus be used to boost the DC voltage at the connections of the additional energy storage device to a higher DC voltage level of the DC voltage intermediate circuit.

If the converter is a rectifier (pulse rectifier) at the input side (the side on the AC current supply network, e.g., on the overhead power line or on a power rail along the stretch) of the DC voltage intermediate circuit, this converter is not needed for the purpose of feeding network energy into the intermediate circuit when the arrangement is being supplied by the motor-generator combination. The converter component, i.e., individual phases, can then be used as boost converters. Particularly if the power supply network is a DC supply network, however, no rectifier is available at the input side. In this case as well as in other cases, the phases of the traction inverter, which is not urgently needed at this time because traction can also be generated with other traction motors, can be employed as a chopper for boosting the voltage level.

If the additional energy storage device is not being charged by a charger, it can be charged directly from the DC voltage intermediate circuit. In this case a phase of the converter is operated as a buck converter, i.e., steps the DC voltage residing in the DC voltage intermediate circuit down to the lower charge voltage level of the additional energy storage device.

In an embodiment of the arrangement, the additional energy storage device is connected to a DC voltage side of a charger, the AC voltage side of which is connected to the auxiliary system line so that the additional energy storage device can be charged while the arrangement is being supplied with electrical energy from the power supply network. Furthermore, said energy storage device is also chargeable when there is surplus electrical power available when the network-independent energy supply unit is in operation. For example, if no traction is required for prolonged time periods, these time periods can be used to charge the additional energy storage device and/or the vehicle battery.

The energy supply network can be a DC network, wherein, for example, a main switch, a filter choke, and/or a boost or buck converter can be arranged in the electrical path between the power supply network and the DC voltage intermediate circuit, as will be described with reference to FIG. 4. If the energy supply network is an AC network, a pulsed rectifier, a main transformer, and a main switch can be arranged between the DC voltage intermediate circuit and the energy supply network.

The auxiliary system line is usually a so-called auxiliary system bus bar.

The network-independent electrical energy supply unit is in particular a unit that is only capable of generating a low level of electric power. In this case small is understood as relative, in proportion to the nominal electric power with operation on the energy supply network. The power output of the unit is in particular small if it is smaller than one fifth of the nominal supply power in network operation. In locomotives, the power of the unit is, for example, 400 kW maximum, in particular 250 kW maximum.

Preference is given to the auxiliary system inverter being separable from the primary side of the auxiliary system transformer by means of a switch. This enables a more effective control of the feed of electrical energy from the network-independent unit into the DC voltage intermediate circuit. In particular, the switch can be opened if the unit only needs to supply auxiliary systems via the auxiliary system line, but traction power is not needed. If there are two auxiliary system lines and two DC voltage intermediate circuits, the switch can also be used to control the electrical energy flows from each desired intermediate circuit into the auxiliary system line, and/or vice versa, particularly if there are electrical connections between the intermediate circuits and/or the auxiliary system lines. With several auxiliary system lines, in each case preference is given to the presence of a switch between the primary side of the auxiliary system transformer and the associated auxiliary system inverter. Further preference in this case is given to the presence of a switch, either alternatively or also, on the secondary side of at least one of the auxiliary system transformers. If in addition there is an electrical connection between the auxiliary system lines on the primary side as well as on the secondary side of the auxiliary system transformers, there are numerous advantageous control possibilities for optimizing the operation of the electrical energy supply system.

Preference is given to a three-phase configuration of the auxiliary system line, in particular so that it can be operated with three-phase current. The same applies to any other auxiliary system lines. Accordingly, preference is also given to multiphase configuration of the aforementioned switches.

If a second DC voltage intermediate circuit and a second auxiliary system line are present, preference is given to the following embodiment, in which the arrangement has the following additional features:

a second DC voltage intermediate circuit, which is connected to the energy supply network when the arrangement is being supplied with power from the energy supply network, at least one second traction inverter, which is connected to the second DC voltage intermediate circuit at the DC voltage side and to the AC voltage side of which are connected one or more traction motors of the rail vehicle, a second auxiliary system inverter, which is connected to the second DC voltage intermediate circuit at the DC voltage side and which is connected to a primary side of a second auxiliary system transformer on the AC voltage side, wherein auxiliary systems are hooked up to a secondary side of the second auxiliary system transformer via a second electrical auxiliary system line, wherein said auxiliary systems, in contrast to the at least one second traction motor, do not serve directly to provide traction of the rail vehicle, a first switching device, in the switched-on state of which the first auxiliary system line is connected to the second auxiliary system line.

In particular, the first switching device, which can open and close an electric line connection (preferably a three-phase line connection) between the first and the second auxiliary system line, can be a switching device that is arranged in a line connection of the auxiliary system lines on the secondary side of the auxiliary system transformers. In this case, preference is given to provision of an additional second switching device, in the switched-on state of which the primary sides of the first auxiliary system transformer and the second auxiliary system transformer are connected to each other. In the case of multiphase auxiliary system lines, this switching device is accordingly likewise a multipole switching device. It should be possible to isolate all of the individual phases of the auxiliary system lines from each other by means of the first or second switching device.

These different switches and switching devices in particular make it possible to supply just one or also both of the DC voltage intermediate circuits with electrical energy in order to optimize the transfer of energy from the network-independent energy supply unit. Depending upon the given operation situation, for example, the maximum possible traction is thus achievable.

In particular, provision can be made of a control mechanism for controlling all switches and switching devices that, depending upon the selected operational state and depending upon how much traction the engineer requires at that time, automatically sets all switches and switching devices to an appropriate switching state in order to generate the desired traction on at least one of the available drive motors.

By means of a third switching device, a dipole connection or disconnection of the lines of the first DC voltage intermediate circuit to or from the lines of the second DC voltage intermediate circuit is achievable. However, it is also possible to dispense with such another possibility for connecting the first partial system to the second partial system in order to enable the following operation mode:

To increase the power of the total achievable traction, a line connection between the first auxiliary system line and the second auxiliary system line can be established on the primary side and/or on the secondary side of the auxiliary system transformers so that the feed of electrical energy by the network-independent energy supply unit is essentially symmetrical, i.e., both of the DC voltage intermediate circuits, as long as the auxiliary system inverters are being operated in the same mode (as is preferred), are able to receive the same electrical energy from the network-independent unit. Whether both of the DC voltage intermediate circuits are actually supplied with the same electric power from the unit, however, depends on whether the traction motors hooked up to the DC voltage intermediate circuits are also being operated with the same power.

A symmetrical supplying of the DC voltage intermediate circuits by the network-independent unit can also take place if the aforementioned dipole switching mechanism is closed and both of the DC voltage intermediate circuits are thus connected to each other. Also in this case preference is given to the auxiliary system lines being connected to each other on the secondary side and optionally also on the primary side of the auxiliary system transformers. Connection on the secondary side has the advantage that the network-independent unit can feed energy into the intermediate circuits via two auxiliary system transformers.

By means of the line connection and the corresponding switching device on the secondary side of the auxiliary system lines, electrical energy can be supplied from the network-independent unit via several auxiliary system transformers, which are connected in parallel on the secondary side as well as on the primary side by a multipole switching device. Particularly by means of switches or switching devices directly on the DC voltage side of the auxiliary system inverter, the electric power produced by the network-independent unit for feeding the intermediate circuit or circuits can be selectively transferred to just one of the intermediate circuits or to both of the intermediate circuits.

The same applies to the case in which more than two DC voltage intermediate circuits are present. Switches for connecting the intermediate circuits, the auxiliary system lines connected to the individual intermediate circuits, and for disconnecting the auxiliary system inverters from the associated auxiliary system line can be present with more than two DC voltage intermediate circuits in a manner analogous to that described above.

If several DC voltage intermediate circuits with at least one traction inverter connected thereto in each case are available, in the case where a high starting traction is required preference is given to operating all drive motors via the corresponding traction inverters connected thereto. This means that all DC voltage intermediate circuits with connected traction inverters must also be supplied with electrical energy even when the arrangement is not being operated on the energy supply network. In particular, the various possibilities described above regarding the switching states of the switches and switching devices described above can be employed to this end.

However, in order to make optimum use of the currently available power input provided by the network-independent supply unit for the traction of the rail vehicle, preference is given to supplying only a portion of the traction motors or even just one traction motor with electrical energy via the traction inverter or inverters connected thereto, depending upon the current vehicle speed as well as traction motor and inverter power losses. Particular preference is given to both of the processes described in the previous paragraphs being controlled by a control mechanism in such a way that as much energy as possible is saved and the power of the network-independent supply unit is thus optimally employed. The control mechanism controls the processes with the available switches and switching devices, opening or closing them (or using them to maintain the current switching state) in accordance with the demands (which, e.g., are specified by the engineer, such as high traction or cost-effective use of the available electrical power) in order to achieve the desired result.

Additionally, preference is given to setting the required torque of the traction motors with the least possible motor current and/or reducing the magnetic flux of the machine as much as possible. If the required electric power is provided solely from the network-independent supply unit, this helps in using the available power more efficiently and in making out with minimum power input, in particular with high traction.

The control of the switches and switching devices of the energy supply system is preferably configured such that, depending upon the available electric power or whenever electric power is only being generated by the network-independent unit, auxiliary systems are shut down and/or temporarily shut down. To this end, either the auxiliary systems themselves are equipped with a controllable switching option or their connection to the auxiliary system line is equipped with a controllable switching mechanism. For example, it is thus possible to reduce the power required by the auxiliary systems during a period in which an especially high traction power is required. The auxiliary systems that cannot be switched off and the auxiliary systems that can be alternatively and/or intermittently switched on and off will be described with reference to an illustrative embodiment in the description of the figures.

The invention further relates to a locomotive with the arrangement of the invention.

BRIEF DESCRIPTION OF THE DRAWINGS

Illustrative embodiments will now be described with reference to the appended drawing. In the following summary description of the drawing, mention is also made of FIGS. 1 and 2. The latter, however, show prior art configurations and were described in the beginning.

DETAILED DESCRIPTION OF THE INVENTION

Figure 3:
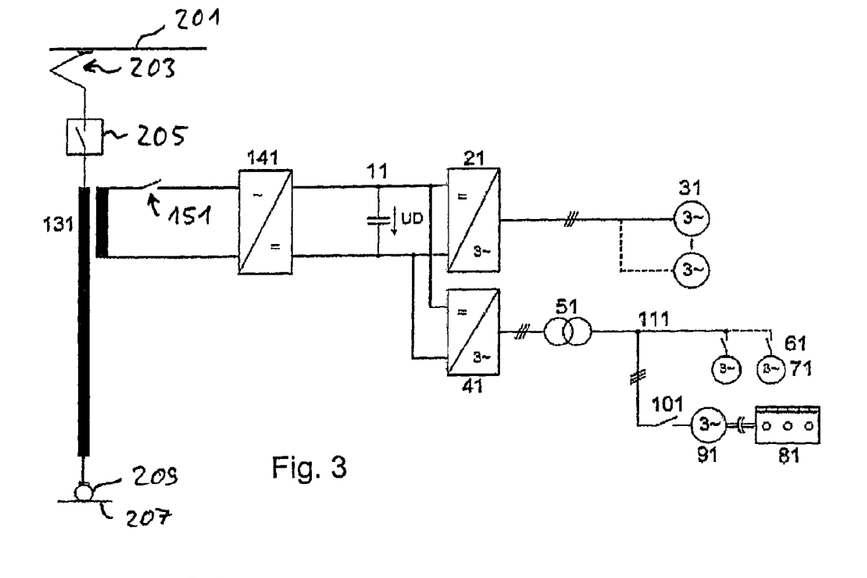
FIG. 3 is a schematic illustration of a first embodiment of an arrangement in which the motor-generator combination is electrically connected to the auxiliary system line.

FIG. 3 shows a simplified basic circuit for systems that can be operated on AC power wires. The same reference numbers as in FIG. 1 and FIG. 2 are used for parts and elements that are the same or have the same functions. The DC voltage in the DC voltage intermediate circuit 11 is designated with UD. It resides on the poles of a condenser.

The combination of the motor 81, particularly a diesel engine, and the generator 91 is connected to the auxiliary system line 111 via a circuit breaker 101.

With operation on the network, power is fed in via the transformer 131 and the infeed pulse rectifier 141 on the traction intermediate circuit (DC voltage intermediate circuit) 11. The traction inverter 21 feeds power to the traction motor or motors 31 and converts the DC voltage UD into a voltage- and frequency-variable three-phase voltage.

FIGS. 3-6 in each case show simplified illustrations of just one infeed pulse rectifier and a traction inverter for feeding power to two drive motors (traction motors). For higher outputs, power is supplied via two or more than two pulse rectifiers, which supply power on the intermediate circuit 11 via separate transformer secondary coils. The traction motors are often configured to be driven individually by separate inverters rather than for operation in parallel as shown in FIG. 3. It is also possible for just one traction motor to be hooked up to the intermediate circuit 11.

In normal network operation, the auxiliary system inverter 41 feeds power via the auxiliary system transformer 51 to the auxiliary system 71 with fixed frequency or (for other operating modes or for other types of auxiliary systems) also with variable frequency. The standard nominal values of the auxiliary system line are 480 V/60 Hz or 400 V/50 Hz.

Figure 5:
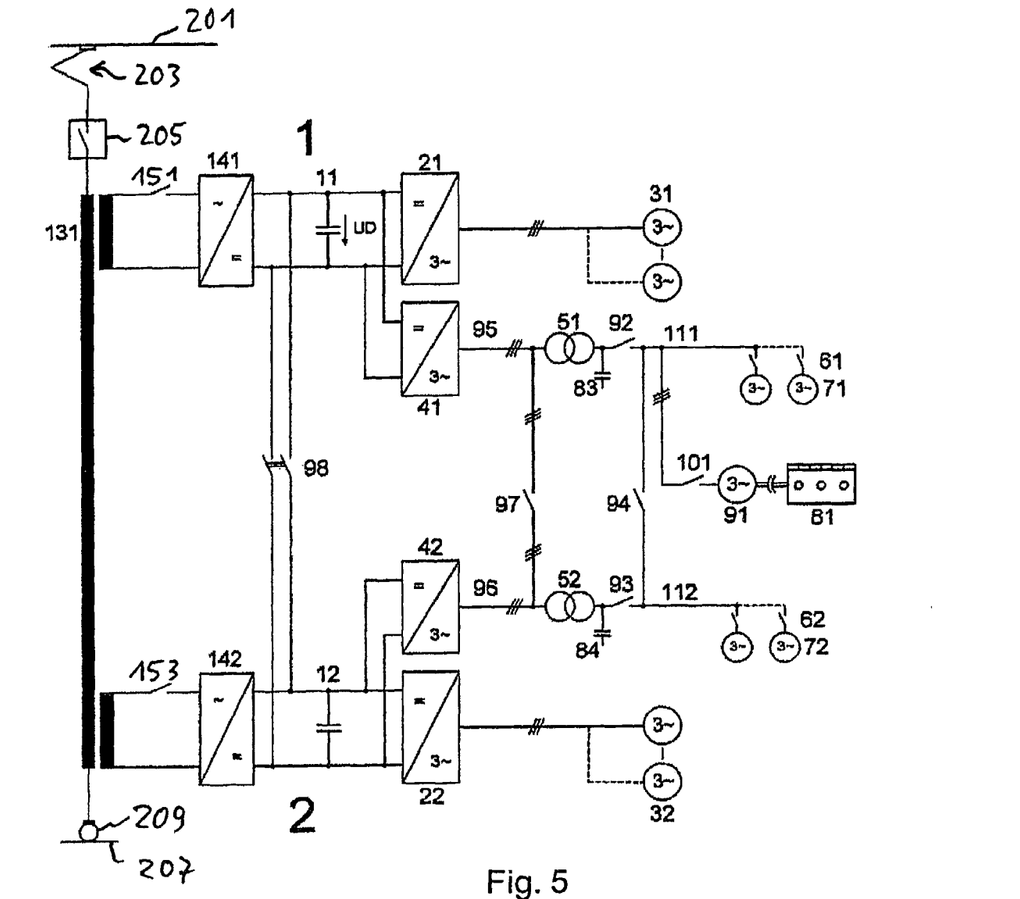
FIG. 5 shows an arrangement with two DC voltage intermediate circuits each connected to a separate secondary coil of the main transformer, each of which feeds at least one traction motor via a traction inverter and auxiliary systems on an auxiliary system line via an auxiliary system inverter.

In order to smooth out the voltage pulses of the auxiliary system inverter on the auxiliary system bus bar or line 111, a deep pass filter (not shown in FIG. 3) consisting of an inductor and a capacitor can be interconnected between the auxiliary system inverter 41 and the bus bar 111. FIG. 5, however, does show condensers 83, 84 of such deep pass filters for another embodiment. The filter gives rise to an approximately sinusoid voltage on the bus bar 111. The inductor can be configured as a discrete three-phase choke or achieved in the more usual manner with a high leakage inductance of the auxiliary system transformer.

The auxiliary system inverter 41 is a 3-phase voltage inverter, the positive and negative DC voltage terminals of which are connected to the traction intermediate circuit 11.

In wireless operation, the energy supply unit with the generator 91 and the internal combustion engine 81 feeds power via the switching device 101 on the auxiliary system bus bar 111 and thus directly supplies the auxiliary systems 71 required for operation. Power is additionally transferred to the traction intermediate circuit via the auxiliary system transformer 51 and the auxiliary system inverter 41. The desired intermediate circuit voltage of at least five tenths to seven tenths of the nominal intermediate circuit voltage is achievable by suitable selection of the transformation ratio of the auxiliary system transformer 51 in a passive manner via the 6-pulse diode rectification of the auxiliary system inverter 41, without this inverter having to synchronize actively.

In the event that a precisely controlled intermediate circuit voltage is desired, the auxiliary system inverter 41 can be synchronized as a pulse rectifier, and transforms the AC voltage applied to the bus bar 111 by the generator into a DC voltage UD of a predefined level.

Figure 4:
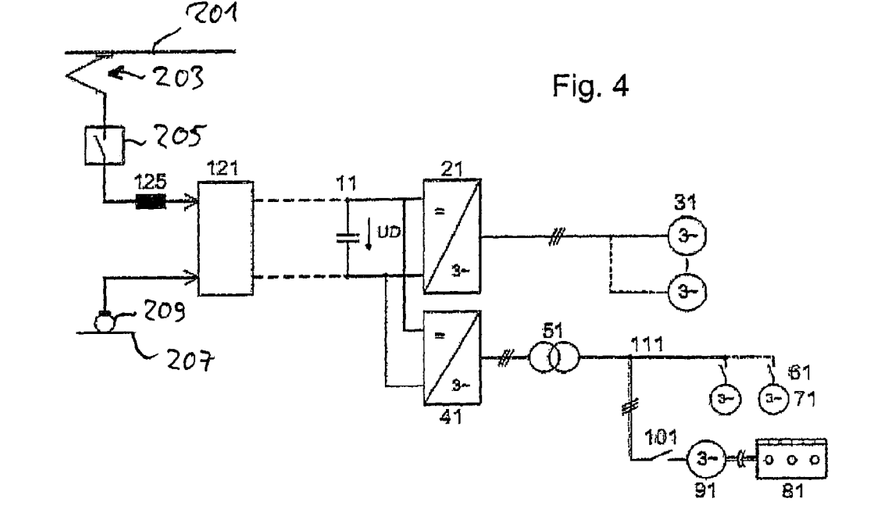
FIG. 4 shows an arrangement similar to the one in FIG. 3 in which, however, the network side of the DC voltage intermediate circuit is hooked up to a DC network.

FIG. 4 shows a simplified basic circuit for use on the DC power wire. Only the differences with respect to FIG. 3 will be described. For operation on the DC network, power is supplied in the usual manner via a filter choke 125 directly to the traction intermediate circuit 11 or via the interconnection of an additional filter and chopper 121 to the traction intermediate circuit 11.

Figure 6:
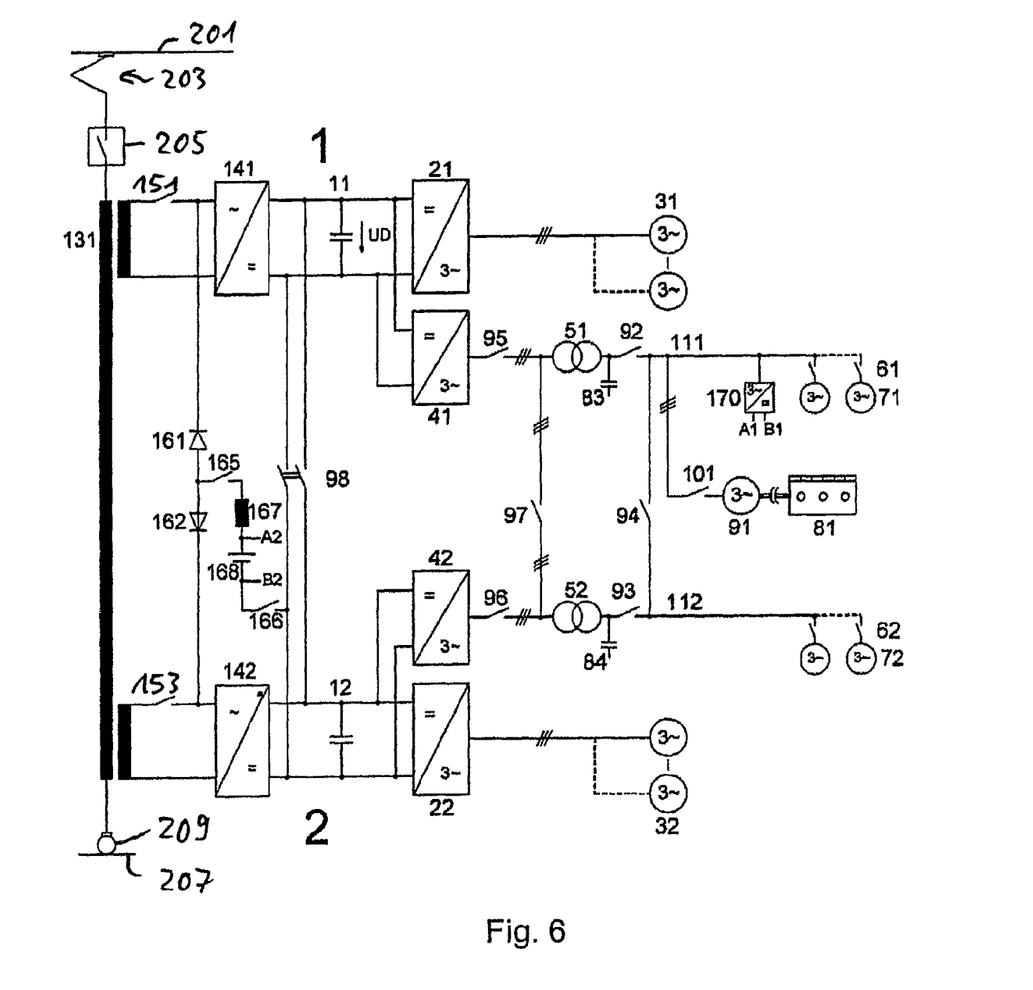
FIG. 6 shows an arrangement as shown in FIG. 5 in which, however, provision is also made of an additional energy storage device.

FIGS. 5 and 6 show a simplified arrangement with two traction converters 1 and 2, the intermediate circuits 11, 12 of which can be connected via a switching device 98. Converter 1 feeds both of the traction motors 31 and essentially consists of an infeed pulse rectifier 141, a traction intermediate circuit 11, a traction inverter 21, an auxiliary system inverter 41, and the auxiliary system transformer 51. Converter 2 for feeding both of the drive motors 32 consists of the same basic components: infeed pulse rectifier 142, traction intermediate circuit 12, traction inverter 22, auxiliary system inverter 42, and auxiliary system transformer 52.

In order to transfer as much power as possible to one or to both of the intermediate circuits 11 and 12 without having to oversize the auxiliary system transformers 51, 52, both of said transformers 51, 52 can be connected on the secondary side (auxiliary system side) via the switching device 94 and optionally on the primary side as well via the switching device 97. In the event that a converter (e.g., converter 1) malfunctions, the latter can be isolated from the supply by opening the switching device 95 (FIG. 6) and, if present, the switching device 98.

In FIG. 6 an additional electrical energy storage device 168 is supplemented in order to increase the power. Via an inductor 167, a switching mechanism 165, and optionally via additional decoupling diodes 161, 162, a pole of the energy storage device 168 is connected to an AC input of the infeed pulse rectifier or rectifiers 141,142. When the electrical energy supply system is not being operated on the energy supply network, according to a preferred embodiment of the invention one phase of the pulse rectifier 141 and/or 142 works as a boost converter and boosts the voltage of the energy storage device (e.g., ca. 70 V-300 V) up to the desired intermediate circuit voltage UD. The other pole of the energy storage device is connected to the negative pole of the intermediate circuit 12 (or to intermediate circuit 11 even with switch 98 closed) via a switch contact 166. When there is surplus energy, the energy storage device can be charged directly from the intermediate circuit 11 via the infeed pulse rectifier 141, 142. In this case both of the decoupling diodes 161, 162 are dispensed with and one phase of the infeed pulse rectifier works as a buck converter and converts the raised intermediate circuit voltage UD into the lower voltage of the energy storage device.

A concrete embodiment is indicated in FIG. 6, in which the additional energy storage device 168 (this also applies to other ways of connecting the additional energy storage device 168 to the DC voltage intermediate circuit or circuits) can be charged by a charger 170 connected to an auxiliary system line 111. On its DC voltage side the charger 170 has connections A1, B1 that are connected to the connections A2, B2 with opposite poles of the additional energy storage device 168.

To move, for example, a locomotive with an 800-1700 ton train with a low power (e.g., in the range of 150 kW-250 kW) energy supply unit (motor-generator combination 81, 91), special control measures can be implemented in the energy management and traction control area in order to achieve maximum traction power with the available low power input. For optimum energy use, one or any combination of the following process steps, measures, and/or control routines is employed, depending upon the particular configuration of the invention:

All high power (e.g., >2 kW) auxiliary system consumers are switchably configured by switching devices 62 and shut off when necessary.

When there is a demand for traction, especially when starting, all unnecessary auxiliary systems are shut off, e.g., all auxiliary system consumers except for the converter coolant pump, the air compressor for the brake system, and certain low power consumers are shut off in order to have maximum traction power available.

With short-term use and switched off auxiliary systems (fans, coolant circuit, etc.), the waste heat generated by the electrical components (such as the coil of a traction motor) is either not evacuated or only evacuated to a limited extent. Instead this heat is absorbed by the thermal capacity of the components involved in the transfer of electrical energy (e.g., the material of the coils of the transformer 51, 52) and of the converter coolant. With longer term operation in particular, auxiliary system consumers 72 (e.g., fans) are alternatively and/or intermittently turned on and off in order to prevent said components and coolants from overheating.

Depending upon the adhesion state (wheel-track contact), the attached haulage load, and the speed, traction is generated with four, two, or even with just one drive motor (individual motor drive).

In order to achieve maximum traction motor torque and minimum motor power losses, the machine flux is lowered in a power loss-optimized manner.

A short term 40 to 100% increase in traction power is achievable by selective needs-based withdrawal of energy from the additional energy storage device 168.

The invention claimed is:

1. An arrangement for operating consumers in a rail vehicle with electrical energy, wherein the arrangement can be supplied selectively with electrical energy from an energy supply network or from a network-independent electrical energy supply unit, comprising:
    a. a DC voltage intermediate circuit, which is connected to the energy supply network when the arrangement is being supplied from the energy supply network;
    b. at least one traction inverter, which is connected at the DC voltage side to the DC voltage intermediate circuit and to the AC voltage side to which one or more traction motors of the rail vehicle are connected; and
    c. an auxiliary system inverter, which at the DC voltage side is connected to the DC voltage intermediate circuit and which at the AC voltage side is connected to a primary side of an auxiliary system transformer, wherein auxiliary systems are connected via an electrical auxiliary system line at a secondary side of the auxiliary system transformer, wherein the auxiliary systems, in contrast to the at least one traction motor, do not serve directly to provide traction of the rail vehicle, wherein the network-independent electrical energy supply unit is electrically connected to the auxiliary system line so that when the arrangement is being supplied by the network-independent electrical energy supply unit, electrical energy generated by said network-independent electrical energy supply unit is transferred via the auxiliary system line, the auxiliary system transformer, and the auxiliary system inverter into the DC voltage intermediate circuit and is available for operating the at least one traction motor.

2. The arrangement of claim 1, wherein the auxiliary system inverter can be isolated from the primary side of the auxiliary system transformer by means of a switch.

3. The arrangement of claim 1, wherein said arrangement further comprises:
    a. a second DC voltage intermediate circuit that is connected to the energy supply network when the arrangement is being supplied from the energy supply network;
    b. at least one second traction inverter that is connected at the DC voltage side to the second DC voltage intermediate circuit and to the AC voltage side to which are connected one or more traction motors of the rail vehicle;
    c. a second auxiliary system inverter, which is connected at the DC voltage side to the second DC voltage intermediate circuit and which is connected at the AC voltage side to a primary side of a second auxiliary system transformer, wherein auxiliary systems are connected to a secondary side of the second auxiliary system transformer via a second auxiliary system line, wherein said auxiliary systems, in contrast to the at least one second traction motor, do not serve directly to provide traction of the rail vehicle; and
    d. a first switching device, in the switched-on state of which the first auxiliary system line is connected to the second auxiliary system line.

4. The arrangement of claim 3, wherein said arrangement further comprises:
    a. a second switching device, in the switched-on state of which the primary sides of the first auxiliary system transformer and of the second auxiliary system transformer are connected to each other.

5. The arrangement of claim 3, wherein said arrangement further comprises:
    a. a third switching device, in the switched-on state of which the first DC voltage intermediate circuit and the second DC voltage intermediate circuit are connected to each other.

6. The arrangement of claim 3, wherein the second auxiliary system inverter can be isolated from the primary side of the second auxiliary system transformer by means of a second switch.

7. The arrangement of claim 1, wherein provision is made of an additional electrically chargeable and dischargeable energy storage device that is present in addition to a vehicle battery, wherein said additional energy storage device is connectable to the various potentials of the DC voltage intermediate circuit via a switch assembly.

8. The arrangement of claim 7, wherein the additional energy storage device is connected to a DC voltage side of a charger, the AC voltage side of which is connected to the auxiliary system line so that the additional energy storage device can be charged while the arrangement is being supplied with electrical energy from the energy supply network.

9. The arrangement of claim 7, wherein electrical connections of the additional energy storage device are connectable to a pulsed converter hooked up to the DC voltage intermediate circuit so that the DC voltage residing on the electrical connections can be boosted by a phase of a rectifier being operated as a boost converter.

10. A method for operating consumers in a rail vehicle with electrical energy, comprising operating at least one traction motor of the rail vehicle by converting a DC voltage of a DC voltage intermediate circuit, and selectively supplying the DC voltage intermediate circuit with electrical energy from an energy supply network or from a network-independent electrical energy supply unit wherein:
   a. auxiliary systems of the rail vehicle, which in contrast to the at least one traction motor do not serve directly to provide traction of the rail vehicle, are also supplied with electrical energy from the DC voltage intermediate circuit via an auxiliary system inverter connected at the DC voltage side to the DC voltage intermediate circuit and connected at the AC voltage side to a primary side of an auxiliary system transformer, and via an electrical auxiliary system line hooked up to a secondary side of the auxiliary system transformer; and
   b. in supplying the DC voltage intermediate circuit with energy from the network-independent electrical energy supply unit, this energy is fed into the auxiliary system line, transformed by the auxiliary system transformer, and rectified by the auxiliary system inverter and fed into the DC voltage intermediate circuit to operate the at least one traction motor.

11. The method of claim 10, wherein an additional energy storage device, which is present in addition to a vehicle battery and which is electrically chargeable and dischargeable, is charged and, when the DC voltage intermediate circuit is being supplied with energy from the network-independent electrical energy supply unit, discharged by connecting said additional energy storage device to said DC voltage intermediate circuit in order to achieve a higher traction performance of the at least one traction motor.

12. The method of claim 11, wherein the additional energy storage device, when the DC voltage intermediate circuit is being supplied with electrical energy from the energy supply network or when surplus power not needed for operating the auxiliary systems and the at least one traction motor is available, is charged by a DC voltage side of a charger, the AC voltage side of which is connected to the auxiliary system line.

13. The method of claim 10, wherein electrical connections of the additional energy storage device are connected to a pulsed converter hooked up to the DC voltage intermediate circuit so that the DC voltage residing on the electrical connections is boosted by a phase of a rectifier being operated as a boost converter.

14. The method of claim 10, wherein, when the DC voltage intermediate circuit is being supplied with electrical energy from the network-independent electrical energy supply unit, electrical energy from a vehicle battery of the rail vehicle is transferred into the DC voltage intermediate circuit in order to achieve a higher traction performance of the at least one traction motor.

* * * * *